(No Model.) 3 Sheets—Sheet 1.
T. M. FELL.
PROCESS OF AND APPARATUS FOR MAKING HEATING AND ILLUMINATING GAS.
No. 288,701. Patented Nov. 20, 1883.
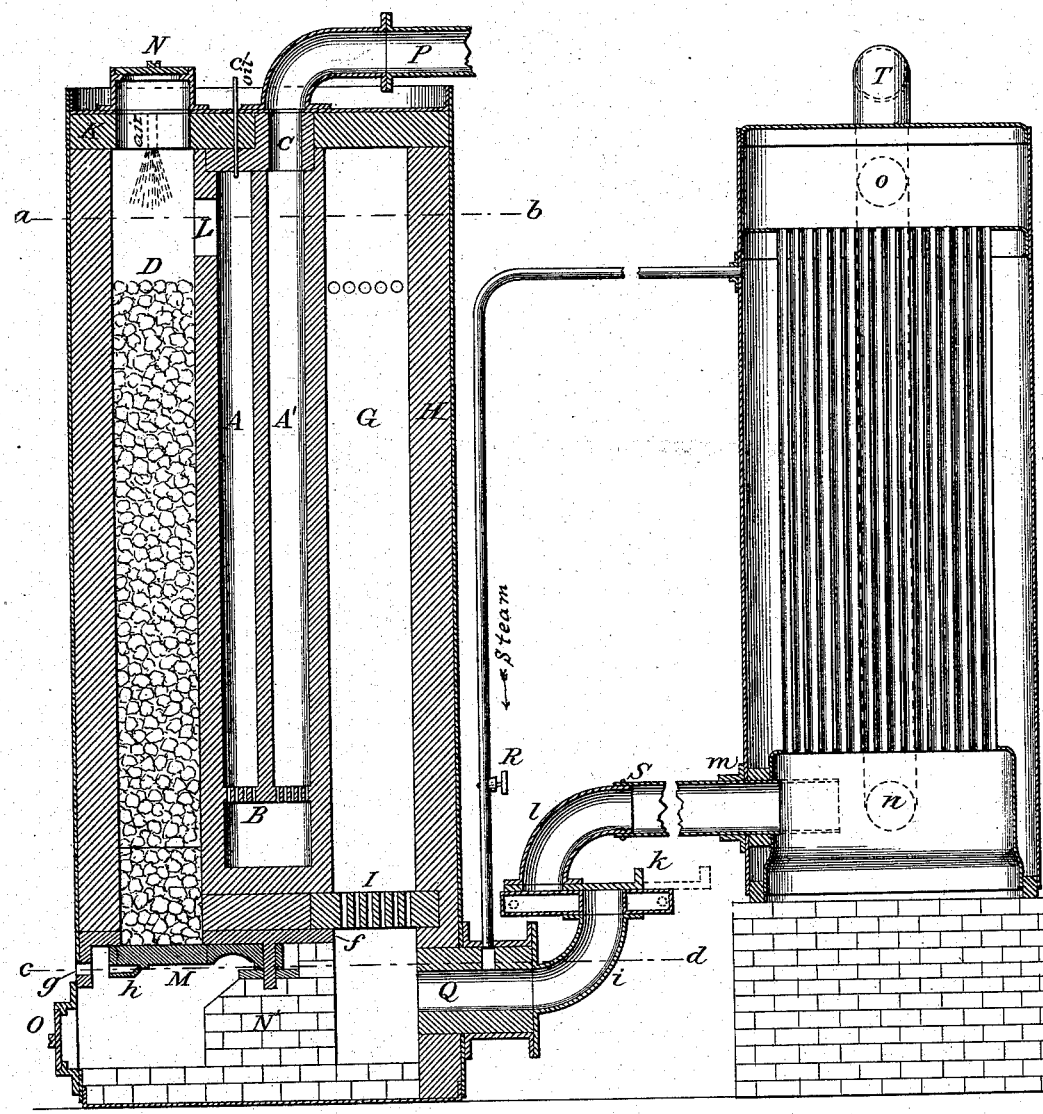
Witnesses:
George B Hughes.
Ira A Kimball
Inventor:
Thomas M Fell (No Model.)  3 Sheets—Sheet 2.
T. M. FELL.
PROCESS OF AND APPARATUS FOR MAKING HEATING AND ILLUMINATING GAS.
No. 288,701.  Patented Nov. 20, 1883.
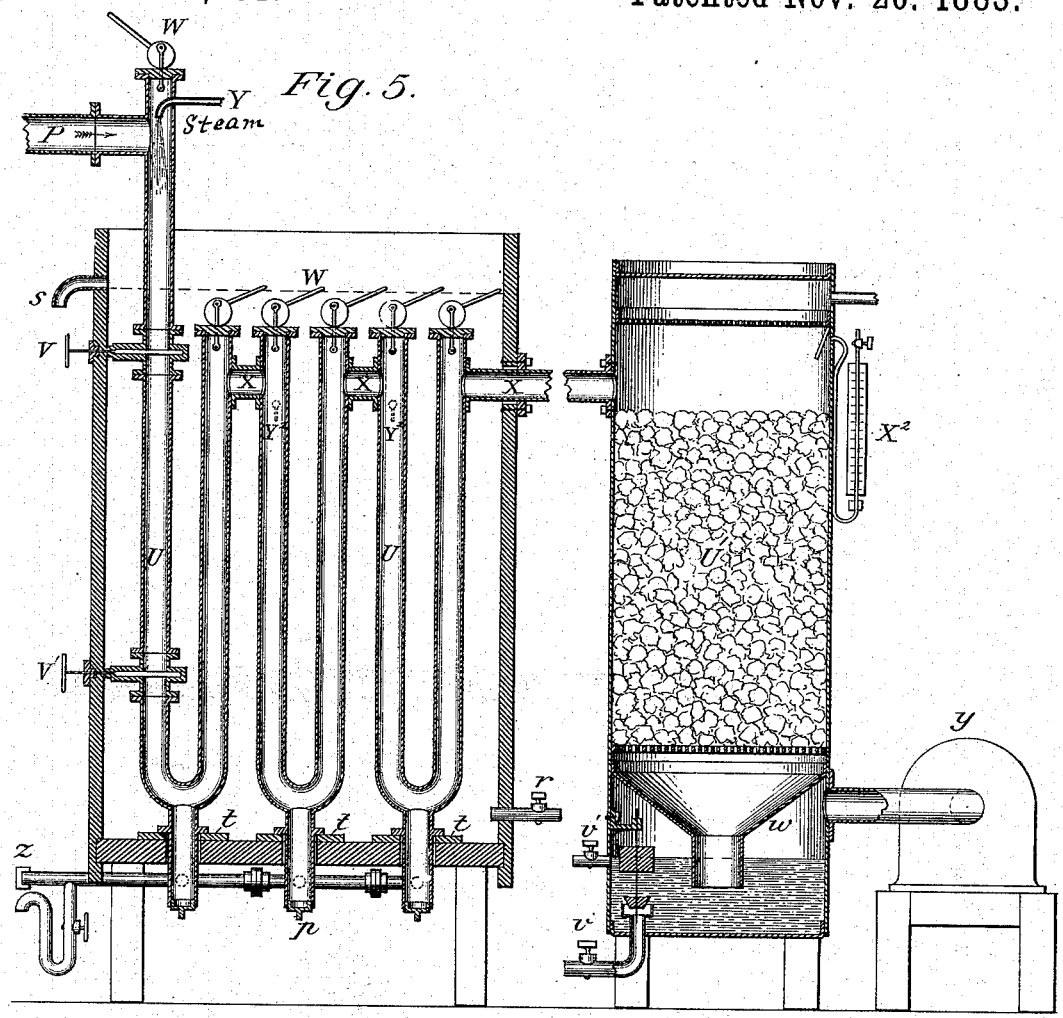
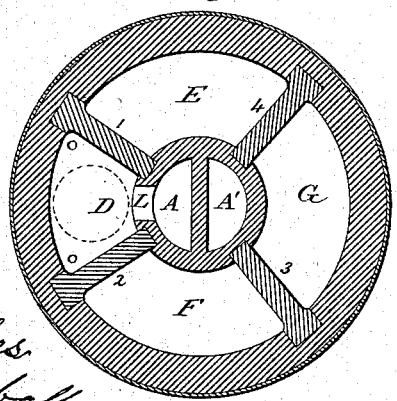
Witnesses:
George B. Hughes
Ira A. Kimball
Inventor:
Thomas M. Fell (No Model.)  3 Sheets—Sheet 3.

T. M. FELL.
PROCESS OF AND APPARATUS FOR MAKING HEATING AND ILLUMINATING GAS.

No. 288,701.  Patented Nov. 20, 1883.

Witnesses:
George B Hughes
Ira A Kimball

Inventor:
Thomas M. Fell

UNITED STATES PATENT OFFICE.

THOMAS M. FELL, OF BROOKLYN, NEW YORK.

PROCESS OF AND APPARATUS FOR MAKING HEATING AND ILLUMINATING GAS.

SPECIFICATION forming part of Letters Patent No. 288,701, dated November 20, 1883.

Application filed February 4, 1881. Renewed October 25, 1883. (No model.)

*To all whom it may concern:*

Be it known that I, THOMAS MARA FELL, a citizen of the United States, residing at Brooklyn, in the county of Kings and State of New York, have invented new and useful Improvements in the Process of and Apparatus for Making Heating and Illuminating Gas; and I do hereby declare that the following is a full, clear, and exact description of the invention, which will enable others skilled in the art to which it appertains to make and use the same.

My invention relates to the manufacture of gas prepared by decomposing steam by means of a body of incandescent carbon fuel, termed "water-gas;" and the object of my invention is to obtain such gas for heating purposes in a condition more nearly approaching a pure admixture of hydrogen and carbonic-oxide gas than is now obtained; and a further object of my invention is providing an economical and continuous process whereby such purified gas may be carbureted for illuminating purposes.

Hitherto in the manufacture of water-gas the adulterants—carbonic acid and the sulphur compounds—have more or less mixed therewith, owing to an inefficient manner of neutralizing, combining, or discharging the same during the first operation of bringing the fuel into an incandescent condition, termed "blowing up by atmospheric air," and from the manner practiced in feeding or using the fuel. By my process the sulphur is speedily combined and driven off, in combination with oxygen, as sulphurous acid, the bulk of which is discharged during said blowing up, and the remainder condensed and removed from the valuable heating and illuminating gases before entering the gas-holder. The carbonic acid is either discharged with the other useless gases or reconverted into carbonic oxide.

The mechanism by which I prefer to carry out my process is represented by the accompanying drawings, in which similar letters refer to similar parts throughout the several views, and in which—

Figure 4:
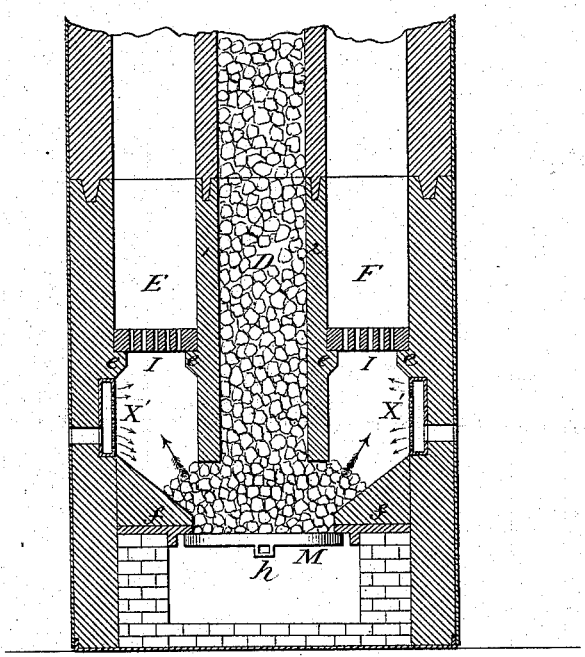
Figure 3:
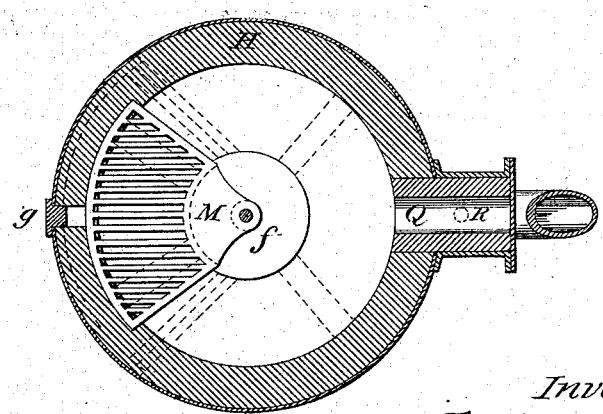

Figure 1 represents a vertical longitudinal view, and Figs. 2 and 3 sections or plans through at the lines *a b c d*, of my converter, or the furnace part of the apparatus; and Fig. 4, a vertical longitudinal transverse view of the lower part of Fig. 1, illustrating the arrangement of fire or shaking bars; Fig. 5, a vertical longitudinal view of the combined purifier and condenser; and Fig. 6, the water-evaporator for supplying steam for conversion into gases, operated by the waste heat and by a peculiar water-valve, as is hereinafter more fully explained.

The construction and operation of the converter differ very materially from any furnace so far created, and it consists of a central fire-clay retort divided by a partition into two compartments, A and A', having a perforated disk, B, near the bottom, and a luted lid and outlet-cover, C, at the top. Surrounding this retort are constructed four chambers, D, E, F, and G, the sides or walls 1 2 3 4 (see Fig. 2) made preferably of fire-brick slabs, either in one piece or in sections, luted together by cement, and a tongue-and-groove joint, as shown in Fig. 4. These chambers are further surrounded by a fire-brick wall, H, and the whole kept together and made gas-tight by an outer casing of iron. Of these chambers, D, which may be smaller in area than the others, is filled, or nearly so, with carbon fuel (clean anthracite, coke, &c.,) to which is added a percentage of salt (chloride of sodium) previously dissolved and mixed with the fuel. Chambers E, F, and G and both sides of the chamber A are partially filled with round balls or pieces of fire-clay or other good fire material, resting upon perforated disks I at the bottom of each. The slabs 1 and 2 (see Figs. 2 and 4) start from the top slab, K—that is, there is no outlet at the top except through the inlet-retort hole L—and descend down to within twelve or eighteen inches of the fire-bars M, the slabs 3 and 4 being fixed reversely, starting from the bottom and ending about the same distance from the top slabs, K. In order to prevent a too direct current of the gases through these chambers, I prefer to make the sides or slabs which enter the wall H of the shape shown, so that the balls or pieces may fill the corners, and for a support to the disks I construct projections *e*.

The construction and operation of the fire-shaking bars are clearly seen in Figs. 1, 2, and 4. Upon the center brick-support is placed a plate of iron, *f*, having a pivot. This casting extends across and is bolted to the outside iron casing, the bars M being moved backward or forward by inserting a rod through the opening stopped by the luted plug $g$ into the notch $h$. N is the door for charging fuel, and O ash-pit door, both opened or closed with a tight cover; P, exit for the heating or illuminating gases; Q, exit for fire-combustion gases, and R a steam-pipe.

The construction and operation of the peculiar water-valve, S, are as follows: To the exit Q, which consists of an enlarged iron pipe lined with fire material, is bolted an iron elbow with flange, $i$, upon which rests and is fastened a flat hollow square vessel, through which water is constantly circulating by an inlet and outlet pipe at the points shown by the dotted lines. The top side of this vessel is planed smooth, so as to form a tight joint with the bottom surface of the plate K. In the drawings the outlet-hole is shown closed by this plate. Another elbow, $l$, is securely fastened on the top surface of K, and is furnished with a sheet-iron pipe, which enters the bottom chamber of the water-evaporator through the sliding sleeve $m$. By this arrangement I furnish means of controlling and passing hot gases which would destroy any ordinarily-constructed valve. The position of the parts when open is shown by the dotted lines, and the valve remains tight by its own weight.

Fig. 6, or the water-evaporator, is essentially a boiler, the upright type of which is better suited for my mechanism. It is fitted with a double set of exit-pipes and dampers, $n$ and $o$, by which the generation of steam is controlled by passing the gases either direct to the chimney T by $n$ or through the tubes and the exit by $o$.

Fig. 5 is a combination of a vapor-purifier and a cold-water condenser, in which U are a series of iron vessels or pipes having return-bends and outlets at the bottom, stopped with plugs $p$; P, the receiving-pipe for the heating and illuminating gas, and which is a continuation of the same pipe seen in Fig. 1; V and V′, sliding valves; W, surface-tight covers operated by the movable handles and hangers, as shown. Surrounding these vessels, which constitute a long run by the branch pipes X, is a cistern holding water, which is supplied by the cock $r$ and the overflows; Y, Y′, and $Y^2$, steam-jets; Z, outlet-pipe for discharging excess of condensible matter, and $t$ plates upon which the U-pipes rest and are kept tight by resting on a rubber or other packing. U′ is the cold condenser, having a perforated bottom which supports a mass of any porous material—coke, brick, &c.—supplied with water through another perforated plate at the top; $v$, the overflow; $w$, a conical dip-pipe forming a hydraulic stop; $v'$, try-cock; $X^2$, a pressure and vacuum gage, and $y$ an exhaust-fan for delivering gases direct to the gas-holder.

The operation and process are as follows: The coal or other carbonaceous material which is placed or fed into the fire-chamber D is first treated by mixing therewith a solution of chloride of sodium. A temporary chimney is put over the sleeve of the fuel-door N, which is elongated, so as to hold the same, and air is admitted by the ash-pit door O. After the fire is well lighted, the doors N and O are fastened up and a blast of air directed downward upon the fire, which is shown by the dotted lines, and the gases passed by the valve S to the boiler or water-evaporator by the following course: first down through the fuel or fire chamber D, dividing near the shaking bars M (see Figs. 1 and 4) into two currents, one passing up by the chamber E and the other by the chamber F. Then both streams unite and descend the chamber C, and by the outlets Q and S to the boiler, and by either flue $n$ or $o$ to the chimney. The combustible gases arising at the bottom of chambers E and F consist, principally, of carbonic oxide, to ignite which two streams of air are here met, which are forced through the perforated fire-brick plates $x'$. The chambers E, F, and G are thus highly heated, while the central chamber, A, is kept at a much lower degree of heat. For the production of water-gas I close the valve S, open valves V V′, turn off the air from each of its points of entry, and turn on the steam by the cock and pipe R, which, entering at the exit of the other gases, causes a direct opposite current back to the fuel, passing now first up and through G, dividing at this point by passing over the partitions 3 and 4 into and down through chambers E and F, and thence to the fuel, through which it passes. The gases now go by the inlet L into chamber A, and, after passing down and through chambers A and A′, escape through the pipe P as water-gas. Of the gases remaining in chambers after the "blowing up" with air, and which are forced back by the steam through the fuel, the carbonic acid is reconverted into carbonic oxide, while the steam, being first highly superheated, is decomposed in D. For the purpose of removing any small amount of sulphurous-acid gas which may still be present, the water-gas now passes into the purifier U, in which it meets an incoming jet of steam, by the pipe Y, and after traveling by way of the U series, by the branch pipes X, is finally cooled by passing through the condenser U′, from which it is drawn out by the exhauster $y$, and so to the gas-holder.

For the production of illuminating-gas I use any of the hydrocarbon oils, which is injected into the top of the chamber A by the pipe $c'$, the vapor of which, after passing, together with the hydrogen and carbonic-oxide gases entering by the inlet L, through the heated material of such chamber, becomes thoroughly fixed or combined, which then passes to the purifier U, cold condenser U′, and by the exhaust-fan $y$ to the gas-holder, all as before stated.

In the working of this furnace or converter it is necessary, as is well understood, to stop the operation of gas-making, in order to keep up sufficient temperature within the apparatus so as to bring about the necessary reaction. This is done by shutting off the steam-jets Y and R and valve V, opening the valve S, and turning on the air-blasts, all as before described.

The central chamber or carburetor is heated by the hot gases passing along its outer side during the blowing up, and internally during the inflowing of the hydrogen and carbonic-oxide gas to be carbureted. The valve V' on the pipe U is simply a duplicate in case of accident to the first valve, and the steam-jets Y' and Y² perform the same function as Y. By operating a converter with the series of chambers, all forming a continuous long run, and inclosed in a single casing, (iron,) I am enabled to economize heat and simplify my mechanism.

A feature of my invention consists in its downward system of firing in the compartment or chamber D. The fuel containing the sulphur, and being fed on top, is exposed to a gradual increasing heat, which, by the direct action of the blast of air and the known effect of chlorine acting on the sulphide base, readily liberates such sulphur in the form of sulphurous acid, which is easily removed by water after being saturated with steam, and in this manner the tendency to the formation of sulphureted hydrogen or other objectionable sulphur compounds is avoided. Any sulphurous or sulphuric acid arriving in the purifier or the U series of pipes, by being first saturated with moisture in the form of vapor— i. e., steam—is more readily extracted by condensation on coming in contact with the cooled surface of the vessels. This steam is drawn off by the waste-pipes Z.

Now, what I claim is—

1. The process of producing heating and illuminating gas, which consists in passing air and superheated steam through incandescent carbonaceous matter mixed with chloride of sodium for the removal of sulphur from its combinations, and for the production of hydrogen and carbonic oxide, carbureting these gases with the vapor of hydrocarbon oil, fixing the mixture of gases and vapor by passing them through a heated retort, and finally purifying the resulting gas by treating with steam and water, substantially in the manner herein specified.

2. The superheating-chambers E, F, and G and the converting-chamber D, having fire-bars M, leading to an ash-pit, in combination with carbureting-chamber A, the whole arranged and operated in the manner and for the purposes as substantially described.

3. The steam-jets Y, in combination with the long-run pipes U, receiving-pipe P, discharge-pipe Z, connecting-pipes X, and the movable covers W, all arranged and operated for the purposes and substantially in the manner specified.

4. The valve S, with its hollow water-chamber, the sliding plate K, and sliding sleeve M, all arranged for passing hot gases in the manner and substantially as described.

THOMAS MARA FELL.

Witnesses:
IRA A. KIMBALL,
WM. FERRIS.